United States Patent

[11] 3,632,865

[72] Inventors Barin G. Haskell;
John O. Limb, both of New Shrewsbury, N.J.
[21] Appl. No. 887,490
[22] Filed Dec. 23, 1969
[45] Patented Jan. 4, 1972
[73] Assignee Bell Telephone Laboratories Incorporated
Murray Hill, N.J.

[54] PREDICTIVE VIDEO ENCODING USING MEASURED SUBJECT VELOCITY
12 Claims, 5 Drawing Figs.

[52] U.S. Cl. .......... 178/6, 178/DIG. 3
[51] Int. Cl. .......... H04n 7/12
[50] Field of Search .......... 178/6, 6.8

[56] References Cited

UNITED STATES PATENTS 2,321,611 6/1943 Moynihan .......... 178/6
2,652,449 9/1953 Grahan .......... 178/6.8

*Primary Examiner*—Richard Murray
*Assistant Examiner*—Barry Leibowitz
*Attorneys*—R. J. Guenther and E. W. Adams, Jr.

ABSTRACT: In an encoding system for use with video signals, the velocity of a subject between two frames is estimated and used to predict the location of the subject in a succeeding frame. Differential encoding between this prediction and the actual succeeding frame are used to update the prediction at the receiver. As only the velocity and the updating difference information need be transmitted, this provides a reduction in the communication channel capacity required for video transmission. The scheme may be implemented by comparing the intensities of points in consecutive frames, identifying those points having a significant frame to frame intensity difference as part of the moving subject, determining an estimated velocity of the identified subject, predicting the present frame by translating a portion of the previous frame by the estimated velocity (the translated portion forming the identified subject), and transmitting the updating difference between the actual and predicted present frames along with the predictive velocity information.

INVENTORS B. G. HASKELL
J. O. LIMB

BY David L. Hurewitz
ATTORNEY

PREDICTIVE VIDEO ENCODING USING MEASURED SUBJECT VELOCITY

BACKGROUND OF THE INVENTION

This invention relates to television transmission and more particularly to encoding of video signals using the translation of a subject between two frames to predict a succeeding frame.

Reduction of the communication channel capacity required for the transmission of video information has been accomplished in a variety of ways. One class of techniques involves prediction of a future image from the past images. Many such predictive schemes are known. A simple example is one which assumes that each frame will look exactly like the preceding frame, but such a scheme requires an updating to correct the erroneous prediction when a scene changes between frames or when a region of the scene, such as a subject, moves. In cases such as PICTUREPHONE person-to-person television, translation of the subject between frames is slight but continuous and a prediction predicted upon an absolutely unchanging frame to frame image necessitates substantial updating.

SUMMARY OF THE INVENTION

Successive frames transmitted by closed circuit television systems, such as the PICTUREPHONE system, are very similar because the camera is stationary and movement occurs only in a limited portion of the scene. It is an object of the present invention to utilize this frame to frame movement of a subject in an encoding system to more accurately predict a succeeding frame and reduce the transmission of redundant information, thereby reducing the channel capacity required for video transmission.

The image consists primarily of a stationary background and a subject which is usually a person or object. If the subject moves relative to the camera, the resultant changes in intensity between successive frames cause a region of movement to be defined in the succeeding frame. As used herein, the region of movement in any given frame is defined as the area in which the picture elements in that frame differ significantly in intensity from the intensity of those elements in the preceding frame. Thus, the region of movement does not directly correspond to the subject area because a specific picture element is designated as being part of that region simply by an intensity change and such a change may result from other factors such as noise or the uncovering of previously hidden background area.

In accordance with the method and apparatus of the present invention, the picture elements of the present frame are separated into moving and nonmoving regions as defined above. By means of a correlation process an estimate of a single velocity or frame to frame translation of this region of movement is determined. The prediction of the present frame is an element by element duplicate of the past frame except for the elements in the region of movement which are obtained by translating elements of the past frame according to the determined velocity. Conventional differential coding is then used to update the region of movement to correct for differences between the actual and the predicted present frame. The information transmitted for each frame consists only of a single velocity indication, addressing information for the region of movement and the differential amplitudes.

DETAILED DESCRIPTION

Figure 1:
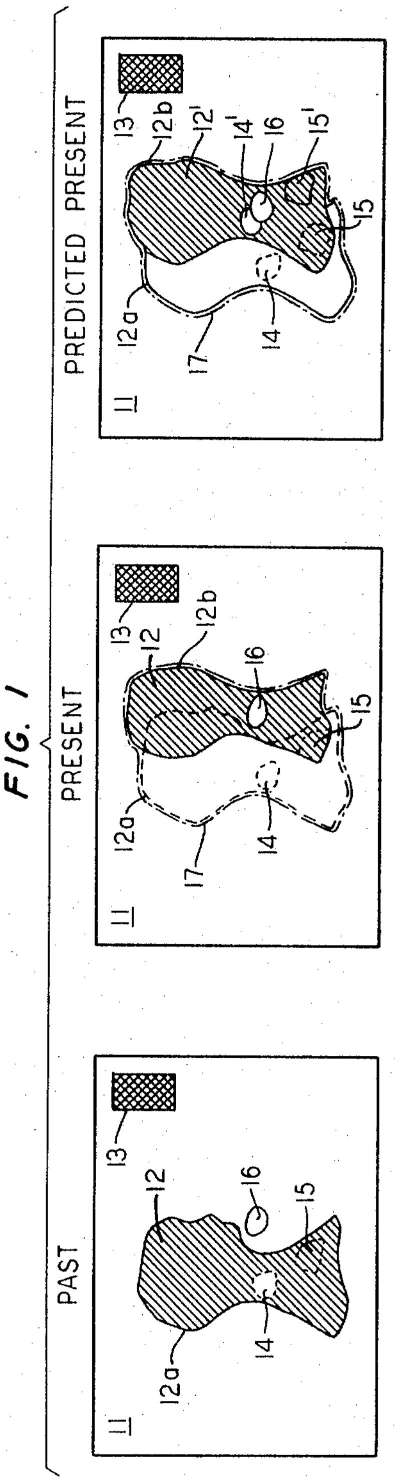
FIG. 1 illustrates a past, present and predicted present frame in accordance with the invention.

FIG. 1 illustrates a scene represented in successive past and present frames and a predicted present frame. The scene consists of a nonmoving background area 11, which might include images of curtains, bookcases, etc. represented by area 13, and a moving subject area 12 which has been chosen for this example to be geometrically nondescript, although it may be the image of a person. Areas 11, (including 13) and 12 are representative of types of areas only and may each, of course, contain picture elements of various intensities within their respective boundaries.

In the past frame subject area 12 is positioned as defined by boundary 12*a*. The present frame illustrates a condition in which subject area 12 has moved to a position defined by boundary 12*b* slightly to the right of its position in the past frame. Dashed boundary 12*a* outlines the location of subject area 12 in the past frame.

The region of movement in the present frame as defined above is composed of those picture elements which have changed significantly in intensity from that of the previous frame. In the present frame of FIG. 1, this region of movement is contained within the long and short dashed boundary 17 since it is assumed that there was no frame to frame intensity change (by movement or otherwise) of background area 11. Within boundary 17 the area exclusively within boundary 12*a* represents the background which was uncovered by the subject's movement to the right, while the area exclusively within boundary 12*b* represents the area of the subject which covers previously exposed background.

The area within boundary 17 also includes the overlapping area defined by both boundary 12*b*, (the present location of subject 12) and boundary 12*a*, (the past location of subject 12). Section 15 is assumed to be one part of the overlapping area which contains picture elements that are accidentally identical in both frames. Since no intensity variation has occurred, section 15 is not part of the region of movement.

Other areas within boundary 17 may also be excluded from the region of movement. For example, sections 14 and 16 denote areas in which the intensity value of elements is coincidentally identical in the past and present frames. Section 14 is a part of subject area 12 in the past frame which matches the intensity of the uncovered background in the present frame, and section 16 is a part of subject area 12 in the present frame which coincidentally matches the previously exposed background. If subject 12 is a person, sections 14 and 16 may be for instance, portions of the subject's collar which has an intensity equivalent to the background, and section 15 may be two parts of the subject's clothing which are identical in intensity. Sections 14, 15 and 16, which are identical in the past and predicted present frames, are merely representative of type of situations which cause portions within the boundary of translation 17 to be excluded from the region of movement. Though every element in these sections is illustrated as having the same intensity in both frames, these sections need not be uniform in intensity. It is also noted that the region of movement is not necessarily a single contiguous area.

In accordance with the invention, the intensities of the individual picture elements in the present frame are compared point by point with the corresponding picture elements in the past frame. The only picture element comparisons which will indicate any change in intensity are those defined by the region of movement in the present frame. All others will show no change and hence will be assigned the same value of intensity in the predicted present frame as they had in the past frame. The picture elements in the region of movement in the present frame will, however, be analyzed as described below to produce an estimated translation vector indicating the average direction and distance which the region as a single unit has moved between the past and present frames.

If, for example, the subject has moved between the past and predicted frames by an average amount of three units to the right and one unit up, this information will be used to form the predicted present frame shown in FIG. 1 in which the intensity values of all picture elements in the nonmoving portions, such as background area 11 and sections 14, 15 and 16, duplicate their intensities in the past frame and the picture elements in the region of movement (within boundary 17 excluding sections 14, 15 and 16) are each given an intensity value equal to that of the picture element in the past frame at a location horizontally three units to the left and one unit vertically below the location of the corresponding element in the predicted present frame. This results in a replica of subject area 12 from the past frame being formed as area 12' within the confines of boundary 17 in the predicted present frame geometrically displaced up and to the right.

The displaced replica includes as part of the region of movement sections 14' and 15' which are translations of elements in the past frame within sections 14 and 15 respectively, even though sections 14 and 15 are not part of the region of movement. There is, of course, no translation into section 16 since it is excluded from the region of movement. The uncovered background area will be filled with element values from background area 11 which are themselves not within the region of movement. There is, of course, no way to correctly predict the intensity in this uncovered region on the basis of the past frame. In addition, predictions based upon translation alone do not accurately predict the subject in cases of rotation or change in shape, such as are caused by moving lips or blinking eyes. A prediction of an actual subject by displacement alone will therefore differ somewhat from the actual present frame and some form of updating by conventional techniques, such as differential coding is required to correct this error. Although a large translation has been shown in FIG. 1 for purposes of illustration, large movement within the short interval between frames rarely, if ever, occurs for human subjects. Thus, the error between the actual and predicted intensities in the region of movement will be, for the most part, small.

A predictive encoding method using velocity of a subject as illustrated in FIG. 1 comprises a series of operational steps: (1) The intensity of each picture element of the present frame is compared with the intensity of he corresponding point in the previous frame; each location in the present frame exhibiting substantial change in intensity from the previous frame is designated as a part of the region of movement which may be composed of many nonadjacent regions; (2) the estimated translation of the region of movement is determined by finding the correlations between the intensities of elements therein with the intensities of picture elements at various fixed displacements in the previous frame; the displacement which shows the maximum correlation is the most likely translation and is taken as the estimated translation vector; (3) A predicted present frame is formed by duplicating the past frame, except that a picture element in the region of movement is replaced by an element in the past frame which is displaced by the estimated translation; (4) The intensities of the picture elements in the predicted present frame and the actual present frame are compared to produce a difference indication for each element in the moving area. The estimated translation (or velocity) and difference information with appropriate addressing to designate the moving area is then transmitted, and the receiver creates the predicted frame from the velocity and addressing information by translating the region of movement and then updates that prediction in accordance with the difference information.

The following detailed description of a specific method and apparatus for estimating the moving area velocity or translation between two frames and forming a predicted frame based upon the velocity is presented in order to clearly explain the operation of the invention.

Figure 2:
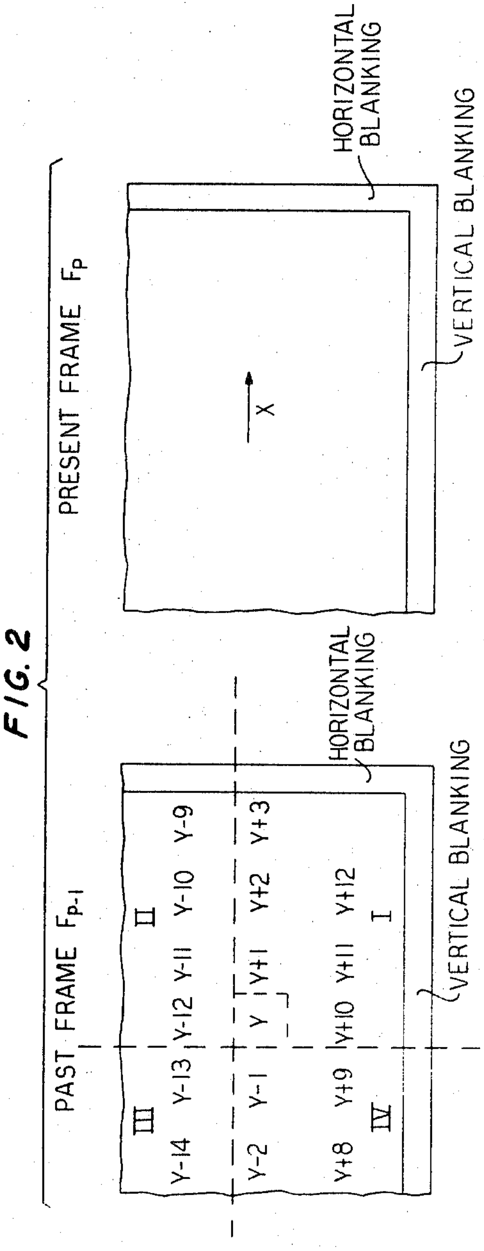
FIG. 2 is a diagram of the elements of segments of two consecutive frames.

FIG. 2 illustrates segments of two consecutive frames, $F_p$ the present frame, and $F_{p-1}$ the immediate past frame. Each frame is composed of N picture elements (some of which may be in blanking areas) aligned illustratively in conventional vertical and horizontal rows. A location or picture element in present frame $F_p$ is designated X and the identical location in past frame $F_{p-1}$ is designated Y. In this example a television camera sequentially scans the elements X in the present frame left to right as indicated. It requires N sampling intervals to complete each successive frame, and hence, Y is scanned N intervals before X. Therefore, if the camera output is delayed for one frame or N intervals, the delayed output will represent Y in frame $F_{p-1}$ while the simultaneously produced camera output represents X in frame $F_p$. Delays of more or less than one frame will result in the delayed element of a previous frame being displaced from the geometric location of the present element. A specific delay corresponds to a specific translation; for instance, a delay of 2 intervals less than one frame provides element Y+2 simultaneously with X.

It is recognized that at certain positions of X in frame $F_p$ a specific delay will correspond to a displacement which translates to a location outside the visual region of frame $F_{p-1}$. For instance, if X were at the extreme right end of a scan line (Quadrants I or II in FIG. 2) a delay of less than one frame (corresponding to a translation to the right) would place the delayed point with which X is co be correlated in the horizontal blanking region or, if beyond that region in time, on the left end of the succeeding line. This loss of delay-translation correspondence also arises at the end of a frame where the translated point may be in the vertical blanking region or possibly in another frame.

The error produced by the improper location of the delayed point would normally be tolerable, especially if only a few selected displacements from the present location of X were correlated. However, in the interest of completeness a disabling scheme, as described below with reference to FIG. 4, can be employed to prevent correlation if the delayed picture element does not correspond to the prescribed geometric translation.

Figure 3:
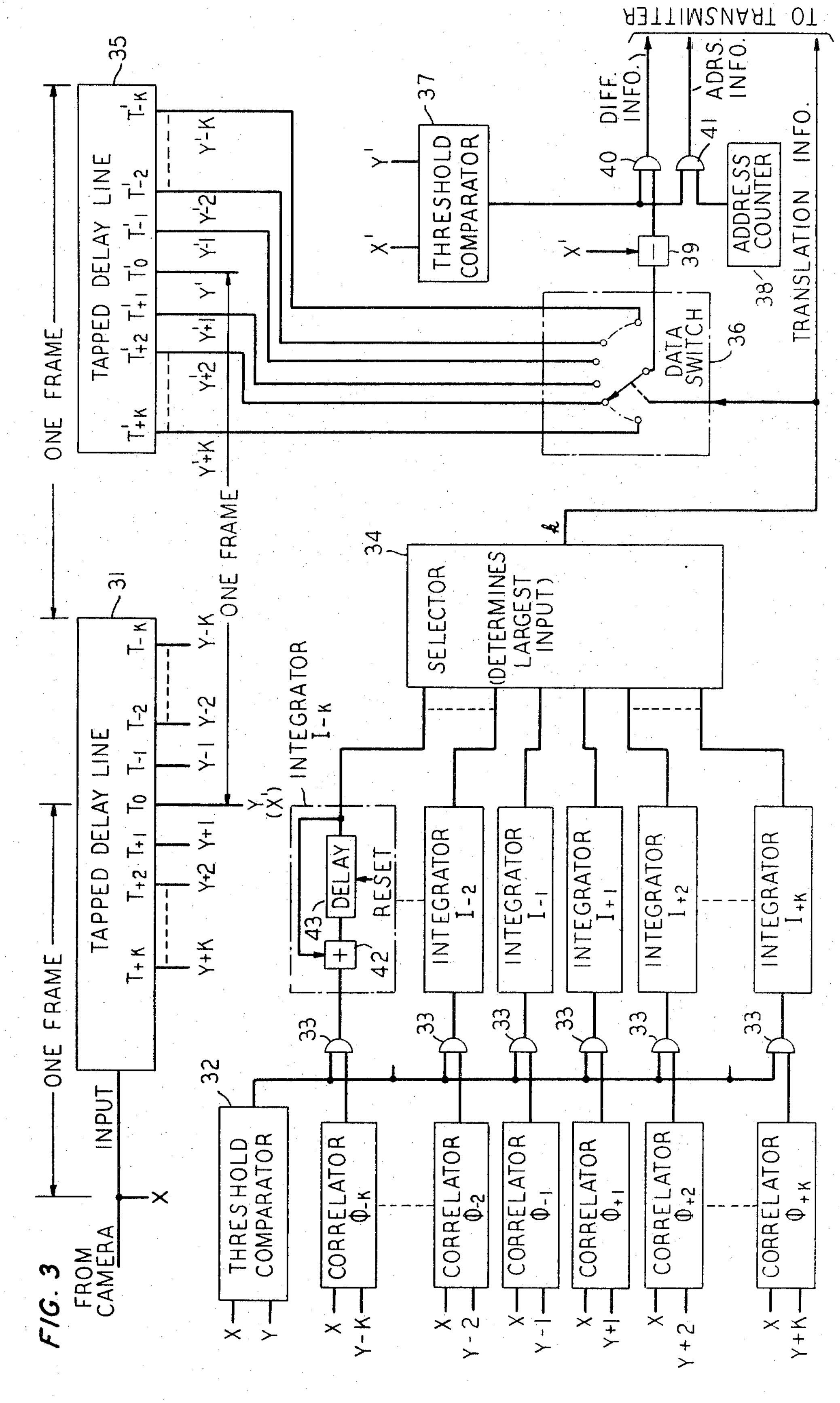
FIG. 3 is a block diagram of a predictive encoder in accordance with the present invention.

FIG. 3 is a block diagram of an encoding system which makes a prediction based upon frames $F_{p-1}$ and $F_p$ of FIG. 2. The intensity value of each picture element X in frame $F_p$ is successively supplied by a camera, not shown, to delay line 31, which contains previously supplied values of frame $F_{p-1}$. When the value of a picture element X in frame $F_p$ is delivered to the input of line 31, the intensity value of the corresponding location Y in frame $F_{p-1}$ appears at tap $T_0$ which is delayed by one frame from the input. Surrounding elements in frame $F_{p-1}$ will appear simultaneously at taps $T_{\pm 1}$... $T_{\pm K}$ which are each separated by single sampling intervals. The outputs Y+1...Y+K on taps $T_{+1}$...$T_{+K}$ are delayed less than one frame, and the outputs Y−1...Y−K on taps $T_{-1}$...$T_{-K}$ are delayed more than one frame.

The first of the aforementioned steps requires dividing the scene into fixed and moving regions as defined above. This accomplished by threshold comparator 32, which compares the intensity of X, an element under consideration in present frame $F_p$, with Y, the geometrically corresponding element in past frame $F_{p-1}$. Comparator 32 produces a binary output having a unit value only when the absolute value of the difference in intensities between X and Y exceeds a preselected threshold indicating that X is an element in the region of movement of frame $F_p$. The present frame input X to comparator 32 is obtained directly from the camera and is identical with the input to delay line 31. The Y input is obtained from tap $T_0$, which corresponds to a delay of one frame, as is described above.

Simultaneously with the delivery of X and Y to comparator 32, X is also applied to each of a number of correlators $\phi_{-K}$ through $\phi_{-1}$, and $\phi_{+1}$ through $\phi_{+K}$. A second input to each correlator is delivered from one of the taps $T_{-K}$ through $T_{-1}$ and $T_{+1}$ through $T_{+K}$. The second inputs are intensity values of elements in $F_{p-1}$ whose positions differ by a fixed translation from the location of X (or Y), and thus, each correlator is associated with a specific velocity or translation vector. For example, correlator $\phi_{+1}$ receives Y+1 simultaneously with X; as seen from FIG. 2, this corresponds to a velocity vector of one unit to the right between frames $F_{p-1}$ and $F_p$.

The output of each correlator is a signal which indicates how close the intensity of one point X is to another one, such as Y+k, where $k=\pm 1 \ldots \pm K$ and corresponds to a selected one of many translation vectors. A suitable correlator may be a multiplier whose output is the product of the two input intensities or a threshold detector whose binary output is unity only if the two input intensities are within a preselected value of each other. In general, the correlators are not identical, but are designed to best detect the particular translation to which it corresponds.

Each element X of $F_p$ is successively correlated with a number of picture elements surrounding the corresponding location Y in frame $F_{p-1}$. The number of points, 2K, which may be included in the region of movement and used for correlation purposes may be selected as desired and may include the entire frame, as illustrated, or merely a small number of selected points translated by amounts which seem appropriate in light of the expected velocity of the subject.

If X is not an element of the region of movement of frame $F_p$, then the intensities at X and Y are approximately equal. If, however, there were movement toward the viewer's left, then the intensity X should be approximately equal to the intensity of some point to the right of Y, for example, Y+1, Y+2, Y+3, etc., in past frame $F_{p-1}$. In statistical terminology, X should show a high average correlation with some point to the right of Y. It is this average correlation which may be used to determine the estimated translation undergone by the subject area between past frame $F_{p-1}$ and present frame $F_p$. If, for example, the comparison shows that points Y−9 in frame $F_{p-1}$ are most highly correlated with points X in frame $F_p$, a good estimate of the subject velocity would be three picture elements to the left and one up per frame interval.

A unit output of comparator 32 indicates that the intensity of X differs significantly from the intensity of corresponding point Y; X is therefore designated as part of the region of movement. A zero output indicates no change and hence, no movement. The output of comparator 32 is applied as an input to each AND-gate 33, each of which has as a second input the correlation signal from one of the correlators $\phi_k$, where $k=\pm 1 \ldots \pm K$ Gates 33 function to block or pass the correlation signal from their associated correlator when the output of comparator 32 is zero or unity, respectively. In this manner the correlation of points outside the region of movement are discarded while the correlation of points in the region are passed to the prediction circuitry.

The gated outputs of the correlators $\phi_k$, are combined over the region of movement by simple summation, such as integration provided by identical integrators $I_k$, where $k=\pm 1 \ldots \pm K$. Gates 33 assure that the input to each integrator is zero for elements X which are not in the moving region of the present frame. Each integrator $I_k$ can be conveniently implemented using adder 42 and delay circuit 43 which has a delay time of one sample interval. The input to $I_k$ is combined by adder 42 with the previous accumulation which is fed back after the one interval delay of circuit 43.

Figure 4:
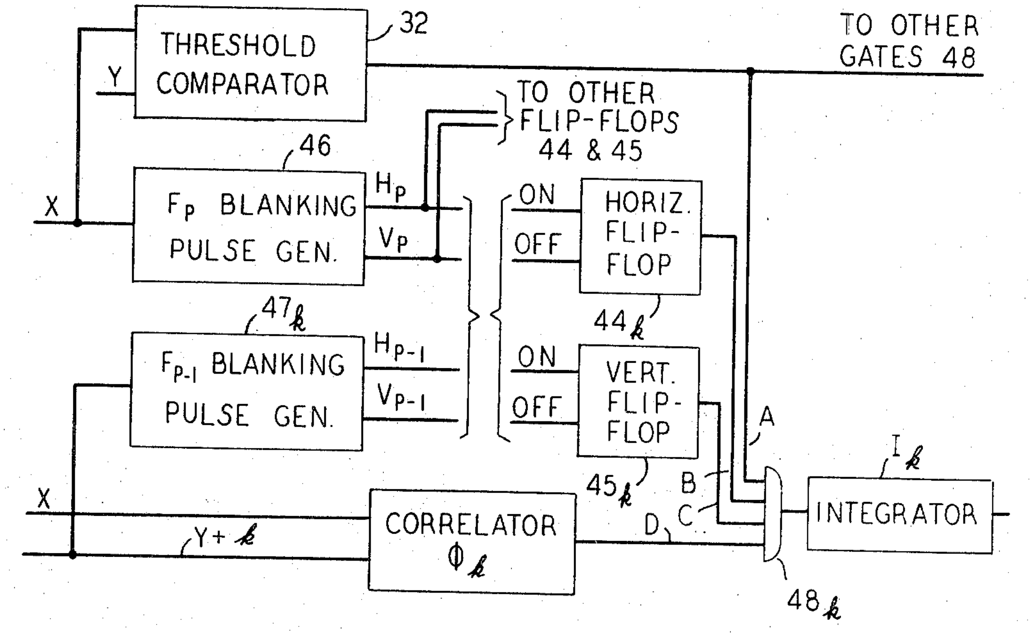
FIG. 4 is a modified version of a portion of FIG. 3, which includes an additional disabling feature.

As mentioned above, a disabling provision may be provided to produce high accuracy correlation. FIG. 4 is a modified version of the interconnection of a sample correlator $\phi_k$ and integrator $I_k$ which provides the disabling feature. $F_{p-1}$ blanking pulse generator $47_k$ is one of 2K generators which each individually monitors the waveform from frame $F_{p-1}$ being applied to one of the 2K correlators $\phi_k$. $F_p$ blanking pulse generator 46 monitors the video waveform of X as frame $F_p$ is scanned. Only a single generator 46 is required since the same point X is applied to all of the correlators. In a conventional manner generators 46 and $47_k$ produce horizontal and vertical blanking pulses $H_p$ and $V_p$, and $H_{p-1}$ and $V_{p-1}$ from the past and present frames, respectively. For example, generators 46 and $47_k$ are assumed to provide a "1" output when the video waveform corresponds to a location within the visual portion of the frame and a "0" output when the waveform corresponds to a position in a blanking region. The horizontal outputs $H_p$ and $H_{p-1}$ are applied to horizontal flip-flop $44_k$ and the vertical outputs $V_p$ and $V_{p-1}$ are applied to a similar vertical flip-flop $45_k$. Flip-flops $44_k$ and $45_k$ produce a "1" output when ON and a "0" output when OFF. A "1" to "0" transition at the OFF input turns the flip-flop OFF and a "0" to "1" transition at the ON input turns the flip-flop ON.

Gate 33 in FIG. 3 is replaced by gate $48_k$ which must have nonzero signals on each of the inputs A, B and C in order to pass to the integrator the correlation information appearing at input D. The outputs from flip-flops $44_k$ and $45_k$ are applied to inputs B and C, and the output of threshold comparator 32 is applied to input A. A "1" signal at input A designates the region of movement, while a "0" signal at input A disables gate $48_k$ as in the operation of gates 33. Thus, for a point X in the region of movement, correlation information is passed only when both flip-flops $44_k$ and $45_k$ are ON.

Each correlator compares points delayed by a specific time which corresponds to a specific geometric translation vector. The type of translation may be classified into one of four groups representing the four quadrants centered about the location of Y in frame $F_{p-1}$ as seen in FIG. 2. Correlators in quadrant I include those which correlate point X with elements displaced directly to the right, directly below and both to the right and below the location Y. Quadrant II correlators compare X with elements directly above and both to the right and above Y. Quadrant III correlators compare X with elements which are both to the left and above Y. Quadrant IV correlators compare X with points directly to the left and both to the left and below Y.

As scanning proceeds, the quadrants move across the frame. Different disabling provisions are required for easy quadrant or type of translation, and the appropriate provisions are provided by differing interconnections of the outputs of generators 46 and $47_k$ to the inputs of flip-flops $44_k$ and $45_k$. For quadrant I, for instance, correlation is inhibited from the time Y+k leaves the visual portion of the frame and enters the horizontal or vertical blanking until X leaves the blanking region on the next line or in the next frame. Horizontal flip-flop $44_k$ must therefore be turned OFF when Y+k enters the horizontal blanking and must be turned ON again only when X leaves the horizontal blanking. For correlators in this quadrant, horizontal blanking pulse $H_{p-1}$ corresponding to Y+k is connected to the OFF input of horizontal flip-flop $44_k$ and horizontal blanking pulse $H_p$ corresponding to X is connected to the ON input of horizontal flip-flop $44_k$. Similarly, for quadrant I, vertical flip-flop $45_k$ must be turned OFF when Y+k enters the vertical blanking and must be turned ON only when X leaves the vertical blanking. Therefore, vertical blanking pulse $V_{p-1}$ is connected to the OFF input of vertical flip-flop $45_k$ and vertical blanking pulse $V_p$ is connected to the ON input of vertical flip-flop $45_k$. Accordingly, when either flip-flop $44_k$ or $45_k$ are OFF the gate $48_k$ is disabled.

The following table defines the conditions under which gate $48_k$ must be disabled to avoid passage of inaccurate correlation data from correlator $\phi_k$ and it shows the appropriate interconnection of generators 46 and $47_k$ to flip-flops (F/F) $44_k$ and $45_k$ for each quadrant.

| $k$ in Quadrant | GATE $48_k$ Disabled when | Connection |
|---|---|---|
| I | Y+$k$ enters Hor Blk until X leaves Hor Blk; | $H_{p-1}$ to OFF input of F/F $44_k$ $H_p$ to ON input of F/F $44_k$ |
| | Y+$k$ enters Ver Blk until X leaves Ver Blk. | $V_{p-1}$ to OFF input of F/F $45_k$ $V_p$ to ON input of F/F $45_k$ |
| II | Y+$k$enters Hor Blk until X leaves Hor Blk; | $H_{p-1}$ to OFF input of F/F $44_k$ $H_p$ to ON input of F/F $44_k$ |
| | X enters Ver Blk until Y+$k$ leaves Ver Blk. | $V_p$ to OFF input of F/F $45_k$ $V_{p-}{}^{1}$ to ON input of F/F $45_k$ |
| III | X enters Hor Blk until Y+$k$ leaves Hor Blk; | $H_p$ to OFF input of F/F $44_k$ $H_{p-1}$ to ON input of F/F $44_k$ |

| | | |
|---|---|---|
| | X enters Ver Blk until Y+$k$ leaves Ver Blk. | $V_p$ to OFF input of F/F $45_k$; $V_{p-1}$ to ON input of F/F $45_k$ |
| IV | X enters Hor Blk until Y+$k$ leaves Hor Blk; | $H_p$ to OFF input of F/F $44_k$; $H_{p-1}$ to ON input of F/F $44_k$ |
| | Y+$k$ enters Ver Blk | $V_{p-1}$ to OFF input of F/F $45_k$ |
| | X leaves Ver Blk. | $V_p$ to ON input of F/F $45_k$ |

Whether or not the disabling provision illustrated in FIG. 4 is used, the combined correlation which appears at each integrator output indicates the degree of correlation for one of 2K translation vector. Referring again to FIG. 3, these outputs are applied at the end of each frame to selector 34 which is used to determine which integrator output is largest and hence which average translation is the most representative of the region as a whole.

The output of selector 34 is the signal $k$, where $k=\pm1, \ldots \pm K$, which identifies the integrator having the largest output. The output $k$ therefore satisfies the second operational step as it corresponds to a specific translation vector defined by the delay between Y and Y+$k$. This specific vector is the estimated translation. A suitable mechanism for selector 34 may compare one integrator output with another, storing the larger value along with an identification of the integrator having this value. The other integrator outputs are then successively compared with the stored value, the search continuing until all comparisons are made. The identity of the integrator whose value is stored at the end of the search is delivered to the output. Appropriate implementation of this and other possible mechanisms, such as may be found in *The Determination of the Time Position of Pulses in the Presence of Noise*, by B. N. Mityashev, published by MacDonald, London, 1965 at page 138, are, or course, apparent to one skilled in the art.

Selector 34 operates only during the vertical blanking time. Thus, if the number of integrators is not large there is sufficient time to carry out the search for the maximum. If the number of integrators is large, many circuits can be arranged so that each one simultaneously analyzes a small number of integrator outputs. The outputs of these circuits can then be analyzed by another circuit to determine which integrator output is largest. After the determination, the previous accumulations in the integrators are cleared for the next frame by a RESET signal initialed by selector 34.

Having completed the first two steps by determining the region of movement in frame $F_p$ and the estimated translation for that region between frames $F_p$ and $F_{p-1}$ , this system is ready to perform the third step of predicting frame $F_p$ from frame $F_{p-1}$. This is done while the next frame, $F_{p+1}$, is being analyzed to determine the average translation between frames $F_p$ and frame $F_{p+1}$. It has taken one frame delay to perform the previous steps, and at this time the frame $F_p$ is stored in delay line 31 while frame $F_{p-1}$ is stored in delay line 35 which has one frame delay and is tapped at the sampling intervals. It is convenient, therefore, to relabel the points in frames $F_p$ and $F_{p-1}$ advanced in time by the additional frame delay X' and Y', respectively, in order to avoid confusion between the outputs of delay lines 31 and 35.

If the output of integrator $I_k$ were maximum, then the best prediction of the intensity of moving region element X' would be the intensity of element Y'+k in frame $F_{p-1}$, where $k=\pm1, \ldots \pm K$. Data switch 36 is employed in order to make available the intensity value of the element in frame $F_{p-1}$ which represents the predicted translation. Thus, for each frame the output of selector 34 sets data switch 36 to the input from delay line 35 corresponding to the translation having the highest correlation in the region of movement. If, for example, $I_{+2}$ had the maximum output, data switch 36 would cause Y'+2, the element corresponding to a translation of two elements toward the left, to appear at its output. Data switch 36 can be simply a switch whose position is controlled as shown by the output of selector 34. The predicted frame is the past frame except that elements X' within the region of movement are replaced with translated elements Y'+$k$ as provided by switch 36.

The fourth step of producing a signal representative of the difference between the actual signal in frame $F_p$ and the predicted intensities is provided by subtractor 39 whose inputs are obtained from tap $T_0$ of delay line 31 and the output of switch 36. The output of subtractor 39 is the difference between the intensities of elements X' and the translated elements Y'+$k$ from the previous frame. Data switch 36 assures that Y'+$k$ is the translated element which corresponds to the estimated translation. If the element X' under consideration is in the region of movement as determined by a threshold comparator 37 which compares X' and Y' appearing at taps $T_0$ and $T'_0$ in delay lines 31 and 35, respectively, then the difference along with the address of the element which is provided by address counter 38 is transmitted to the receiver. Gates 40 and 41 prevent transmission unless the binary output of comparator 37 is unity, thus restricting transmission of the difference signal and the addressing information to those elements in the region of movement.

As indicated above the estimated translation information from selector 34, the difference information from gate 40 and the corresponding address information from gate 41 is applied to a transmitter. This information occurs at a nonuniform rate, and a buffer, not shown, is therefore needed to transmit over any channel which requires a constant data rate.

The encoding method and apparatus described above utilizes a total delay of more than two frames. The required delay can be reduced by one frame if it is assumed that the subject velocity changes slowly compared with the frame rate. By correlating two previous frames, the encoder may construct a prediction of the present frame using the immediate past frame as a reference. While the difference between the present frame and the predicted present frame is being transmitted, a new estimated velocity or translation vector is selected as a prediction of the next succeeding frame.

It is noted, of course, that if acceleration of the subject is assumed to be slowly varying, but nonzero, then instead of the estimated velocity, the encoder utilizing the reduced delay format could use a linear extrapolation of two previously estimated velocities to get a more accurate prediction than if merely the preceding velocity were used.

Figure 5:
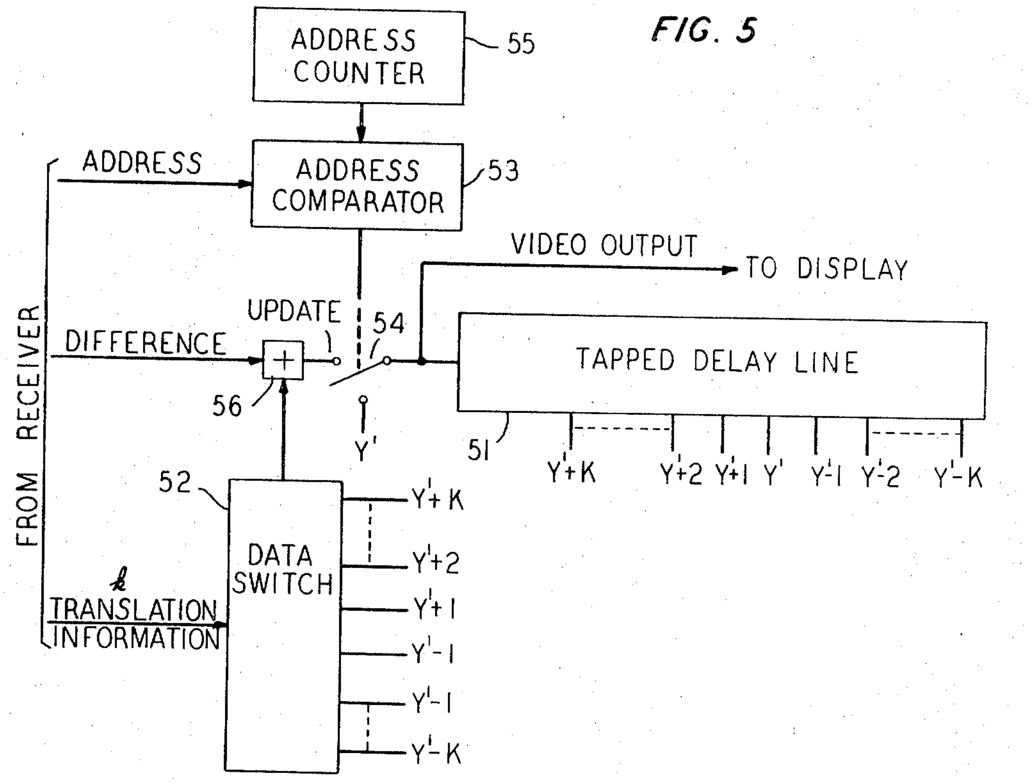
FIG. 5 is a block diagram of a decoder in accordance with the present invention.

The decoder at the receiver is shown in FIG. 5 and is an encoder in reverse except that it does not compute translation vectors. Except for elements in the region of movement, it delivers the video output of the previous frame, on an element by element basis, to a display mechanism, not shown. Elements in the region of movement are replaced with the sum of the appropriately translated element from the previous frame and the received difference signal. Simultaneously, the video signal is applied to a one frame delay line for use in decoding the next frame.

At the start of frame $F_p$, the element values of frame $F_{p-1}$ are stored in delay line 51 and connected through appropriate taps to data switch 52, which is identical to data switch 36. Switch 52 is set to the same position as data switch 36 in response to the received estimated translation vector signal $k$ so that the output of switch 52 is Y'+$k$. During transmission of the address and difference information, address comparator 53 compares the address information of the next received element in the region of movement with that of the next video output element from address counter 55, counting at the same rate as counter 38. If the addresses are not the same, comparator 53 establishes update switch 54 in position Y' thus connecting the delayed intensity value corresponding to the identical geometric location to the display apparatus. If the addresses are the same, update switch 54 is moved under the control of comparator 53 to the UPDATE position in order to apply to the display apparatus the intensity from adder 56 which combines the translated intensity value from data switch 52 and the received difference information. The received address and difference information must, of course, be stored in appropriate buffers where transmission is at a uniform data rate.

The concept of the invention if unrelated to the video format. An interlaced scheme will merely require that an estimated translation be determined after every field instead of after every frame. Analog or digital coding necessitates corresponding analog or digital embodiments of the blocks in FIGS. 3 and 5. For the digital case, for instance, digital integrated circuits are available for data switches. Delay lines may be conventional clocked shift registers.

Gating signals, which can be used to avoid elements in the blanking regions, and clock signals are not described above, but their inclusion is assumed to be well known to persons knowledgeable in the art.

In all cases it is to be understood that the above-described arrangements are merely illustrative of a small number of the many possible applications of the principles of the invention. Numerous and varied other arrangements in accordance with these principles may readily be devised by those skilled in the art without departing from the spirit and scope of the invention.

We claim:

1. A system for encoding a present frame of video signals comprising, means for dividing the picture elements of the present frame into moving and nonmoving regions, means for correlating each picture element in the moving region with elements in a previous frame geometrically displaced from the location of said each picture element to determine an estimated translation of the moving region between the previous and present frames, and means for forming a prediction of the present frame by duplicating the previous frame and by replacing all picture elements at locations within the moving region with picture elements of the past frame displaced by the estimated translation.

2. A system for communicating a present frame of video information comprising, means for dividing the points of the present frame into moving and nonmoving regions, means for correlating each point in the moving region with points in a past frame geometrically displaced from the location of said each point to determine an estimated translation of the moving region between the past and present frames, means for comparing said each point in the moving region with a point in the past frame displaced by the estimated translation to produce a difference indication for each point in the moving region, means for transmitting an indication of said average translation and said difference indication, means for receiving said translation and difference indications including means for reconstructing the present frame by reproducing the past frame with points at locations corresponding to the moving region being replaced by points in the past frame displaced by said estimated translation and updated by said difference indication.

3. Apparatus for encoding video signals of a present frame to form an estimated translation signal and a difference code for a region of the present frame comprising, means for dividing the points of the present frame into moving and nonmoving regions, means for correlating each point in the moving region with points in a past frame geometrically displaced from the location of said each point to determine the average translation of the moving region between said past and said present frames and for producing said translation signal, means for difference coding each point in the moving region relative to the point in the past frame displaced by the average estimated translation to produce said difference code.

4. Encoding apparatus as claimed in claim 3 wherein said means for dividing the points into moving and nonmoving regions includes means for delaying each picture element in the past frame for an interval of one frame, means for comparing the delayed element with the geometrically corresponding element in the present frame to produce a first indication if the two elements are substantially identical and a second indication if the two elements are substantially different.

5. Encoding apparatus as claimed in claim 3 wherein said means for correlating each point in the moving region with displaced points in the past frame includes means for delaying the picture elements of the past frame, means for individually comparing each picture element in the moving region with a plurality of picture elements in the past frame each having a different delay corresponding to a specific geometric translation to produce for each comparison an indication of the similarity of intensity between the picture element in the moving region and the delayed translated element in the past frame, means for summing the representative indications for each different delay corresponding to a specific geometric translation vector, and means for selecting the largest summation and producing said translation signal designating the translation corresponding to the largest summation.

6. Encoding apparatus as claimed in claim 5 further including means for selectively disabling the summation of certain ones of said representative indications between the time one of the elements being compared enters a blanking region and the time another element leaves the blanking region.

7. Encoding apparatus as claimed in claim 3 wherein said means for difference coding each point in the moving region includes delaying the picture elements of the past frame, means for comparing each picture element in the moving region of the present frame with a delayed element having a delay of one frame relative to said each element in the moving region to produce an indication of the difference between said delayed and said each picture element in the moving region.

8. A method for encoding video signals of a present frame comprising the steps of:

comparing the intensity of points at common geometric locations in the present frame and a past frame, and designating as part of a region of movement in the present frame those points having substantially different intensities in the past and present frames, correlating the intensity of each point designated as part of the region of movement in the present frame with the intensity of points in the past frame at locations surrounding the location of the designated point, combining the correlation of each designated point and the surrounding points to determine an estimated translation of the region of movement, forming a predicted present frame by duplicating, at locations in the predicted present frame corresponding to locations of designated points in the present frame, the intensities of points in the past frame displaced by the estimated translation and by duplicating, at locations in the predicted present frame corresponding to locations of points in the present frame not designated, the intensities of undisplaced points in the past frame, and producing an indication of the intensity difference between the displaced points in the predicted present frame and the points at the common locations in the present frame.

9. A method as claimed in claim 8 wherein said step of comparing the intensity of points at common geometric locations includes delaying indications of the intensity of points in the past frame and combining each delayed indication with an intensity indication of the point at a common location in the present frame.

10. A method as claimed in claim 8 wherein said step of correlating the intensity of each designated point with the intensity of points in the past frame at surrounding locations includes delaying the indications of the intensity of points in the past frame and combining the indication of easy designated point in the present frame with selected ones of the indications at different delays, each delay corresponding to a selected translation, to form indications of the similarity of intensities between each designated point and points at the selected translations.

11. A method as claimed in claim 10 wherein said step of combining the correlations includes the steps of individually summing for each selected translation the indications of similarity of all points in the designated region, and selecting the largest of the summations and producing an estimated translation indication therefrom likely average translation.

12. A method as claimed in claim 11 wherein the step of forming a predicted present frame includes delaying all of the indications of intensity of points in the past frame and selecting for the displaced points intensity indications at a delay corresponding to the estimated translation.

* * * * *

UNITED STATES PATENT OFFICE
CERTIFICATE OF CORRECTION

Patent No. 3,632,865 Dated January 4, 1972

Inventor(s) Barin G. Haskell - John O. Limb

It is certified that error appears in the above-identified patent and that said Letters Patent are hereby corrected as shown below:

The title should read --Predictive Video Encoding Using Estimated Subject Velocity--.

In column 4, line 20, "co" should read --to--.

In column 4, lines 43 and 45 should not be underscored.

In column 4, line 49, "is" should be inserted after "This".

In column 6, line 29, "easy" should read --each--.

In column 7, line 2, "$45_{k152}$" should read --$45_k$--.

In column 7, line 17, "vector" should read --vectors--.

In column 7, line 20, "average translation" should read --translation vector--.

In column 9, line 4, "if" should read --is--.

In column 9, line 66 (Claim 3), "average" should read --estimated--.

In column 9, line 72 (Claim 3), "average" should be omitted.

In column 10, line 72 (Claim 10), "easy" should read --each--.

In column 12, line 1 (Claim 11), "likely average translation" should be omitted.

Signed and sealed this 6th day of June 1972.

(SEAL)
Attest:

EDWARD M.FLETCHER,JR.
Attesting Officer

ROBERT GOTTSCHALK
Commissioner of Patents